United States Patent [19]

Mineta et al.

[11] Patent Number: 5,027,026
[45] Date of Patent: Jun. 25, 1991

[54] BRUSHLESS MOTOR

[75] Inventors: Sadayoshi Mineta; Kimio Kitajima; Kunio Shimazu, all of Komagane, Japan

[73] Assignee: Kabushiki Kaisha Sankyo Seiki Seisakusho, Nagano, Japan

[21] Appl. No.: 333,112

[22] Filed: Apr. 3, 1989

[30] Foreign Application Priority Data

Apr. 12, 1988 [JP] Japan .............................. 63-49210[U]

[51] Int. Cl.$^5$ ...................... H02K 1/12; H02K 15/14; H02K 5/00; H02K 5/24
[52] U.S. Cl. ..................................... 310/259; 310/42; 310/51; 310/91
[58] Field of Search ........................ 310/42, 43, 51, 91, 310/177, 179, 181, 217, 254, 268, 259

[56] References Cited

U.S. PATENT DOCUMENTS

| | | | |
|---|---|---|---|
| 3,500,083 | 3/1970 | Dochterman | 310/51 |
| 3,693,035 | 9/1972 | Ostwald | 310/51 |
| 4,425,813 | 1/1984 | Wadensten | 310/51 |
| 4,442,367 | 4/1984 | Suzuki | 310/91 |
| 4,602,176 | 7/1986 | Baker | 310/51 |
| 4,742,256 | 5/1988 | Tanaka et al. | 310/51 |
| 4,761,576 | 8/1988 | Savage | 310/51 |

FOREIGN PATENT DOCUMENTS 336961 10/1930 United Kingdom ................. 310/51

Primary Examiner—Steven L. Stephan
Assistant Examiner—C. LaBalle
Attorney, Agent, or Firm—Wallenstein, Wagner & Hattis, Ltd.

[57] ABSTRACT

A brushless motor is disclosed, in which an armature core is secured to a frame through vibration isolating members by a clamping member having an interval regulator regulating so that the vibration isolating members are held within a regulated thickness determined by the interval regulator.

8 Claims, 2 Drawing Sheets

BRUSHLESS MOTOR

FIELD OF THE INVENTION

This invention relates to a brushless motor with core and in particular to the vibration isolating mechanism therefor.

BACKGROUND OF THE INVENTION

A brushless motor having the construction disclosed e.g. in Japanese Utility Model Laying-Open Publication No. 59-161383 is known as a prior art brushless motor which is shown in FIG. 7 of this application.

In this motor, the center hole 43a of a core 43 is fitted to a step portion 42d of a rotor holder 42 and the core and the rotor holder 42 are secured to each other by means of screws 44.

However, according to this prior art technique, since the core 43 is directly in contact with the rotor holder 42 and a frame 41, it gave rise to a problem that vibration noise due to switching of a coil, etc. are transmitted from the core 43 to the exterior through the rotor holder 42 which produces extraordinary vibration.

In order to remove this problem, the applicants of this application have studied motors having constructions indicated in FIGS. 5 and 6.

In FIG. 5, reference numeral 8 indicates a flange-forming frame having a sleeve 9 (bearing holder) at its central portion. A shaft 21 is supported rotatably by this sleeve 9 on the inner side thereof through upper and lower bearings 22 and 23. A supporter 10 is secured to the shaft 21 at its upper end by inserting it with pressure in the shaft hole of the supporter. An upside down laid cup-shaped rotor case 32 is secured to this supporter 10. A ring-shaped rotor magnet 33 is secured to this rotor case 32 on the inner surface thereof. On the frame 8 stated above a rubber plate 31 serving as a vibration isolator is laid down by using a sleeve 9 as a guide. An armature core 1 consisting of a plurality of magnetic plates superposed on each other is laid down similarly by using the sleeve 9 as a guide. A driving coil 30 is wound around the armature core 1. Screws 27 traverse the armature core 1 and the rubber plate 31 described above. The armature core 1 is fixed between the head portions 28 of the screws 27 and the frame 8 through the rubber plate 31 by screwing the screw into the frame 8. The rubber plate 31 has also a noise reducing function. The outer peripheral surface of the armature core 1 is opposite to the inner surface of the rotor magnet 33 with a predetermined interval, comprising in this way an outer rotor type brushless motor. A bottom plate 26 is secured to the bottom surface of the frame 8 and disposed so as to be opposite to the free end surface of the rotor case 32.

According to the structure described above, drive noise and vibrations are prevented from being transmitted to the exterior, because the rubber plate 31 absorbs the drive noise stated above such as switching noise of the coil 30, control noise, etc. as well as the vibrations.

FIG. 6 shows another example of the brushless motors which the applicants of this application have studied. This example differs from that indicated in FIG. 5 only in that apart from the rubber plate 31 stated above serving as a vibration isolator, another rubber plate 35 serving as a vibration isolator is disposed also between the upper surface of the armature core 1 and the head portions of the screws 27 and the armature core 1 is fixed on the frame 8 through this rubber plate 35 by means of the screws 27, and the other construction is identical to that of the example indicated in FIG. 5.

In the case indicated in FIG. 6 also, the rubber plate 31 and the other rubber plate 35 prevent drive noise such as switching noise, control noise, etc. as well as vibrations from being transmitted to the exterior.

In the brushless motors indicated in FIGS. 5 and 6, as described above, the compressive force of the rubber plates 31, 35 serving as vibration isolators varies, depending on the clamping torque of the screws 27 and therefore they have a problematical point that the noise preventing and vibration isolating effect fluctuates, depending on the clamping torque of the screws 27. There is another problem in that if the compressive force of the vibration isolators is reduced in order to increase the vibration isolating effect, the clamping torque by means of the clamping members is apt to be insufficient and if the clamping torque by means of the clamping members is insufficient, the screws 27 are loosened.

OBJECT OF THE INVENTION

This invention has been done in order to solve these problems and the object thereof is to provide a brushless motor, in which in the case where the armature core is fixed by screws through vibration isolating members, it is possible to keep the compressive force of the vibration isolating members such as rubber plate constant, independently of the magnitude of the clamping torque of the screws so as to reduce fluctuations in the vibration isolating and noise preventing effect, and also to prevent that the clamping torque by means of the clamping members is apt to be insufficient.

SUMMARY OF THE INVENTION

A brushless motor, according to this invention, in which an armature core, around which a coil is wound, is fixed to a frame by means of clamping members through vibration isolating members, is characterized in that there is disposed interval regulating means for the clamping members and the armature core described above and the vibration isolating members disposed on the front and rear surfaces in the superposition direction of the armature core are held by the interval regulating means stated above so as to be arranged at predetermined position with in a limit of regulation.

The interval regulating means regulates the armature core and the vibration isolating members disposed on the front and the rear surfaces in the superposition direction of the armature core so that the interval between the surfaces thereof regulated by them is held constant. In this way, even if the clamping torque of the clamping members fluctuates, the regulated size described above is always constant and the armature core and the vibration isolating members are held therebetween within this limit of regulation.

DETAILED DESCRIPTION

Figure 1:
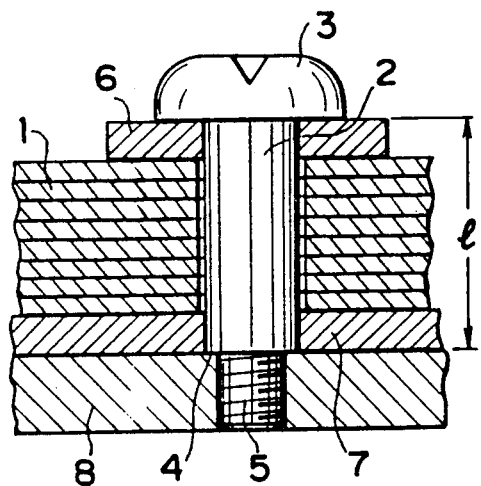
FIG. 1 is a longitudinal cross-sectional view illustrating the principal part of an embodiment of the brushless motor according to this invention.

Hereinbelow, several embodiments of the brushless motor according to this invention will be explained, referring to FIGS. 1 to 4. Since the construction other than the construction portion for the mounting of the vibration isolating members may be same as that of the prior art examples described previously, in FIGS. 1 to 4 only the principal part is indicated and the members which are in common are represented by same reference numerals.

In FIG. 1, reference numeral 2 represents screws serving as clamping members. Each of these screws 2 has a head portion 3 and at the same time a step portion 4 at a position closer to the lower end portion in the Figure. A male-screwed portion 5 is formed in a small diameter portion below this step portion 4. An armature core 1 is located on a frame 8 through a vibration isolating member 7 made of a rubber plate, etc. and another vibration isolating member 6 made of a rubber plate, etc. is located further thereon. The armature core 1 is constituted by superposing a plurality of magnetic plates one on another. As the result of the arrangement of the armature core 1 and of the vibration isolating members 7, 6 as described above, the vibration isolating members 7 and 6 are disposed on the front and the rear surfaces of the armature core 1, respectively, in the direction of the superposition of layers thereof. The screws 2 are inserted, making them completely pass through the vibration isolating member 6, the armature core 1 and the vibration isolating member 7 in the width direction thereof and the male-screwed portions 5 of the screws 2 are screwed in the frame 8. The step portion 4 of each of the screws 2 constitutes means for regulating the interval, i.e. the depth of the screwing is regulated by the fact that the step portion 4 is touched with the upper surface of the frame 8. As the result, the interval between the lower surface of the head portion 3 of the screw 2, which is to hold the vibration isolating member 6, the armature core 1 and the vibration isolating member 7 described above, and the upper surface of the frame 8 is restricted by the interval between the lower surface of the head portion 3 of the screw 2 and the step portion 4 thereof. In this way, the vibration isolating members 6, the armature core 1 and the vibration isolating member 7 are held in a compressed state and arranged within this regulated thickness.

Thus, according to this embodiment, since the interval between the lower surface of the head portion 3 of the screw 2, which is to hold the vibration isolating member 6, the armature core 1 and the vibration isolating member 7 therebetween, and the upper surface of the frame 8 is regulated always to a constant value by the interval between the lower surface of the head portion 3 of the screw 2 and the step portion 4 thereof, independently of fluctuations in the clamping torque of the screw 2, the compressive force applied to the vibration isolating members 6 and 7 is kept always to be constant and thus it is possible to reduce fluctuations in the vibration isolating and noise preventing effect. Further, since the screw 2 may be fastened with a clamping torque, which is stronger than a certain value, and thus the clamping force of the screw 2 is never apt to be insufficient for assuring the elastic force of the vibration isolating members 6 and 7, the screw 2 is never loosened. Furthermore, since the compressive force applied to the vibration isolating members 6 and 7 can be controlled only by controlling the size of the screw 2, it is not necessary to control the clamping torque and thus the control is facilitated.

Figure 2:
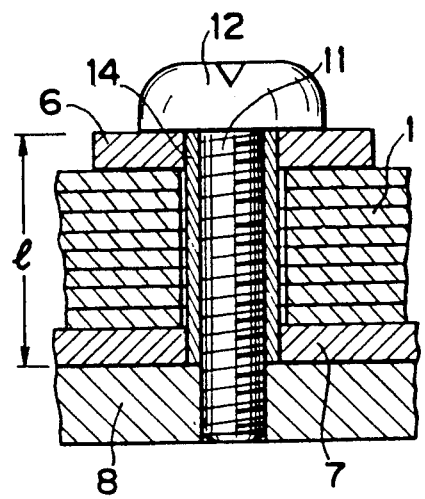
FIG. 2 is a longitudinal cross-sectional view illustrating the principal part of another embodiment of the brushless motor according to this invention.

The embodiment indicated in FIG. 2 will be explained. In this embodiment, a screw 11, which is male-screwed over the whole length, is used instead of the screw with the step portion, in lieu of which a collar 14 is used as the interval regulating means. That is, a collar 14 is inserted in a hole formed in the vibration isolating member 6, the armature core 1 and the vibration isolating member 7 in the thickness direction thereof and the screw 11 is instead in this collar 14. This screw 11 is screwed in the frame 8. The lower end in the figure of the collar 14 is touched with the upper surface of the frame 8 by the screwing of this screw 11. On the other hand, the upper end of the collar 14 is touched with the lower surface of the head portion 12 of the screw 11. In this way, the depth of screwing of the screw 11 is limited. The vibration isolating member 6, the armature core 1 and the vibration isolating member 7 described above are held in a compressed state and arranged within this regulated thickness.

In this way, also in this embodiment, since the armature core 1 and the vibration isolating members 6 and 7 disposed on the front and the rear surfaces, respectively, of the same core 1 in the superposition direction thereof are held and arranged within the regulated interval determined by the collar 14, effects similar to those obtained by the embodiment indicated in FIG. 1 that the compressive force applied to the vibration isolating members 6 and 7 is kept to be constant, fluctuations in the vibration isolating and noise preventing effect are eliminated, etc. can be obtained.

Figure 3:
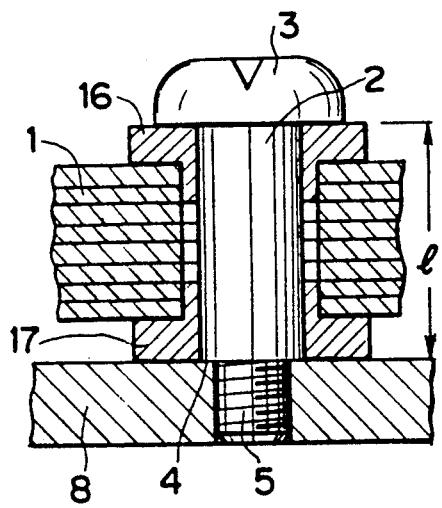
FIG. 3 is a longitudinal cross-sectional view illustrating the principal part of still another embodiment of the brushless motor according to this invention.

In the embodiment indicated in FIG. 3, the same screw 2 as that used in the embodiment indicated in FIG. 1 is used, but the shape of the vibration isolating members disposed on the front and the rear surfaces of the armature core 1 in the superposition direction is different. That is, although the vibration isolating members 16 and 17 are disposed on the front and the rear surfaces of the armature core 1 in the superposition direction, these vibration isolating members 16 and 17 have sleeve-shaped portions, respectively. These sleeve-shaped portions are inserted in the hole formed in the armature core 1 so that the outer surface of the sleeves is opposite to the surface of the hole and the screw 2 is inserted within the sleeve-shaped portions, the male-screwed portion 5 being screwed in the frame.

Also in this embodiment, since the armature core 1 and the vibration isolating members 16 and 17 disposed on the front and the rear surfaces of the same core 1 in the superposition direction are held in a compressed state within a regulated thickness between the lower surface of the head portion is brought into contact with the frame 8, the same effects as those obtained in the embodiments described above can be obtained. Further, in the embodiment indicated in FIG. 3, the two vibration isolating members 16 and 17 are identical to each other and utilized by turning over one of them upside down. Since the shape thereof is simple and at the same time no separate member such as the collar 14 in the embodiment indicated in FIG. 2 is required as the interval regulating means, it is possible to provide interval regulating means with a low cost.

Figure 4:
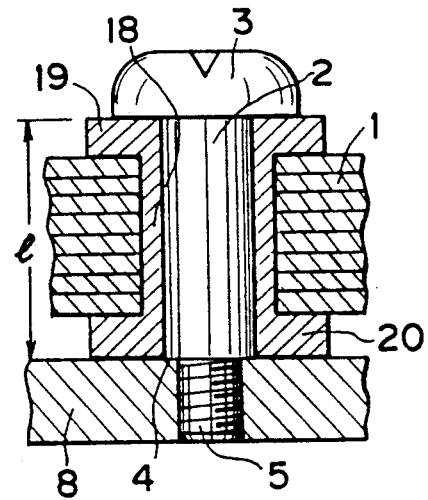
FIG. 4 is a longitudinal cross-sectional view illustrating the principal part of still another embodiment of the brushless motor according to this invention.
Figure 5:
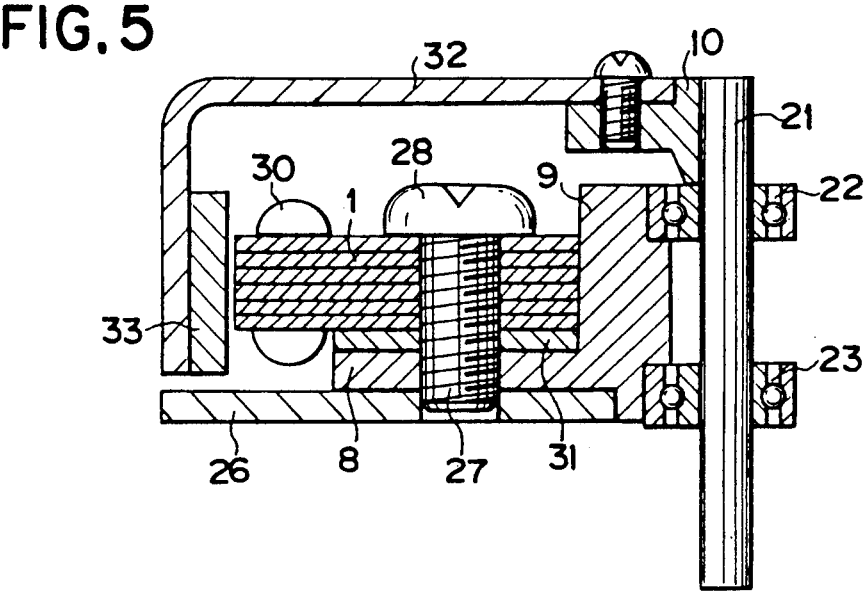
FIGS. 5 and 6 are longitudinal cross-sectional views showing examples of the brushless motor which the applicants of this application have studied.
Figure 6:
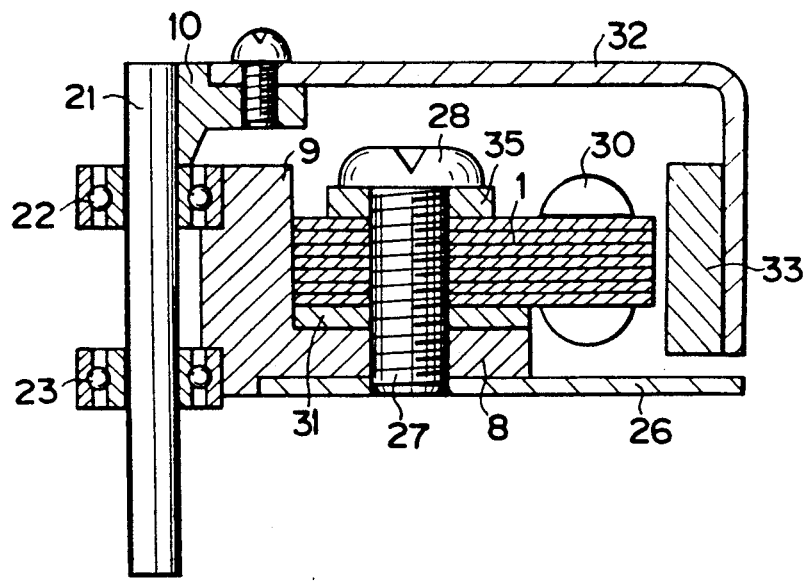
Figure 7:
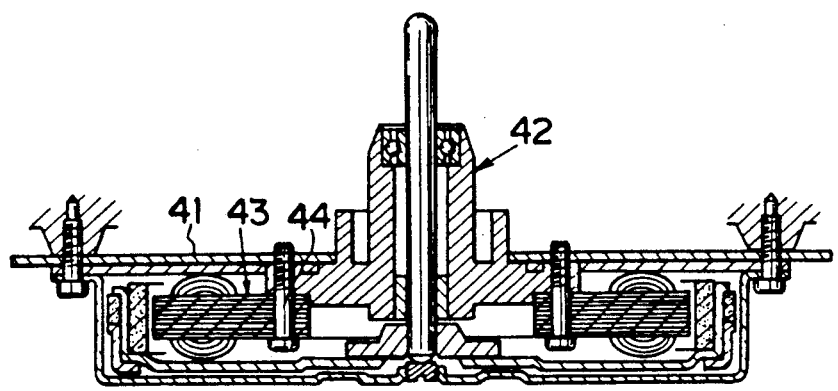
FIG. 7 is a longitudinal cross-sectional view showing a prior art brushless motor.

The embodiment indicated in FIG. 4, differs from that indicated in FIG. 3 in that the upper and lower vibration isolating members 16 and 17 are joined in one body. That is, the vibration isolating member indicated by reference numeral 18 is formed in one cylindrical body extending over the whole length in the up and downward direction having flanges 19 and 20 at the upper and the lower ends thereof. The armature core 1 is held between these upper and lower flanges 19 and 20 of this vibration isolating member 18. The screw 2 having the step portion 4 is inserted in the hole of the vibration isolating member 18 and the male-screwed portion 5 of this screw 2 is screwed in the frame 8.

Also in this embodiment, since the armature core 1 and the flanges 19 and 20 of the vibration isolating member 18, disposed on the front and rear surfaces of the same core 1 in the superposition direction are held within a regulated thickness between the lower surface of the head portion 3 of the screw 2 and the step portion 4 thereof, the same operation and effects as those obtained in the embodiments described previously can be obtained.

For the vibration isolating member, apart from rubber, elastic vinyl chloride resins, thermoplastic resins, etc. can be used and a compressibility of 10 to 40% is suitable therefor.

Further, this invention can be applied not only to an outer rotor type motor but also to an inner rotor type motor.

As explained above, according to this invention, since the armature core and the vibration isolating members disposed on the front and the rear surfaces of the same core in the superposition direction are held within the regulated thickness by the interval regulating means disposed in the clamping member, the compressive force applied to the vibration isolating members described above is kept always to be constant, independently of fluctuations in the clamping torque of the clamping member and it is possible to reduce fluctuations in the vibration isolating and noise preventing effect. Further, since the clamping member may be fastened with a clamping torque which is stronger than a certain value, the clamping force of the clamping member is never apt to be insufficient for assuring the elastic force of the clamping member, and the screw is never loosened. Furthermore, since the compressive force applied to the vibration isolating members can be controlled only by controlling the size of the clamping members, it is not necessary to control the clamping torque and thus control is facilitated.

What is claimed is:

1. A brushless motor comprising:
    frame means for mounting said motor, said frame means including a bearing and armature core holder including an axially extending portion in which bearing means are fitted for receiving a shaft of said motor and a radially extending armature core-supporting portion integral with and projecting outwardly from said axially extending portion;
    a shaft extending axially through said axially extending portion of said holder and rotatably supported by said bearing means;
    rotor means affixed to said shaft, said rotor means including a rotatable rotor housing for enclosing armature core means to be supported on said armature core supporting portion of said frame means, and carrying on the periphery thereof magnet means to confront armature core means to be supported on said holder;
    armature core means enveloped by said rotor housing and supported on one side of said radially extending armature core-supporting portion of said holder and including armature coil means wound on said armature core means;
    passage means extending axially through said armature core means for receiving the shank portion of a clamping means;
    clamping screw means having shank portion means extending through said passage means, said shank portion means terminating at one end in a threaded portion threaded into said radially extending armature core supporting portion of said holder and at the opposite ends in head means adapted to clamp said armature core means upon said holder;
    compressible vibration isolating means having at least a first resilient portion disposed between said head means of said clamping means and said armature core means; and
    said clamping means including limiting means for limiting the extent to which said threaded portion of said shank means can thread into said radially extending portion of said holder so as to provide a predetermined amount of compression of said compressible isolating means.

2. A brushless motor according to claim 1, wherein said vibration isolating means is made of synthetic rubber.

3. A brushless motor according to claim 1, wherein said vibration isolating means is made of vinyl chloride resins.

4. A brushless motor according to claim 1, wherein said vibration isolating means is made of thermoplastic resin-containing material.

5. The brushless motor of claim 1 wherein said limiting means includes a cylindrical portion provided on said shank portion means between said head means and said threaded portion thereof and having a diameter greater than said threaded portion for arrestingly terminating the threading of said screw into said radially extending armature core supporting portion of said holder.

6. The brushless motor of claim 1 wherein said limiting means includes a rigid cylindrical sleeve disposed about said shank portion means and having a length chosen to arrestingly terminate the threading of said screw means into said radially extending armature core supporting portion of said holder.

7. The brushless motor of claim 1 wherein said isolating means includes a second resilient portion between said radially extending armature core supporting portion and the adjacent side of said armature core means having an integral resilient flange disposed between said means head and said core means, said second portion of said isolating means having an integral resilient flange disposed between said core means and said radially extending armature core supporting portion.

8. The brushless motor of claim 7 wherein said first and second portions of said isolating means are portions of a single resilient member formed as a resilient sleeve configured to pass between said shank portion means and the walls of said passage means.

* * * * *